United States Patent

[11] 3,600,095

[72] Inventor Keiichi Tanaka
 Tokyo, Japan
[21] Appl. No. 812,674
[22] Filed Apr. 2, 1969
[45] Patented Aug. 17, 1971
[73] Assignee Agency of Industrial Science & Technology
 Tokyo, Japan
[32] Priority May 9, 1968
[33] Japan
[31] 43/30535

[54] DIFFERENTIAL RING LASER
 1 Claim, 5 Drawing Figs.
[52] U.S. Cl. ................................................ 356/106 LR,
 356/138, 356/152
[51] Int. Cl. ............................................... G01b 9/02,
 G01b 11/26
[50] Field of Search ........................................ 356/106 RL

[56] References Cited
 UNITED STATES PATENTS
 3,433,568 3/1969 Skalski et al .................. 356/106

Primary Examiner—Ronald L. Wibert
Assistant Examiner—Conrad Clark
Attorney—George B. Oujevolk ABSTRACT: A differential ring laser comprising a disc on which a ring laser, an interferometer and a phototube are fixed. A second disc is arranged coaxially with the disc, under the same and provided with the same ring laser, interferometer and phototube as the disc. Means are provided for independently rotating the two discs and there is a counter for counting the difference between the number of beat waves detected by the phototubes on the two discs.

INVENTOR
Keiichi Tanaka

BY George B. Oujirath

ATTORNEY

DIFFERENTIAL RING LASER

The present invention relates to a ring laser in which two ring laser systems are simultaneously rotated to measure the difference between the output beats of this two ring laser system.

It is known that, when a square ring laser having 1 meter sides and consisting of, for example, He-Ne laser tubes is rotated, it generates a number of waves of beat per 1 second angular displacement. In such a ring laser, however, when the angular velocity is lower than the characteristic velocity of the ring laser, coupling of oscillation modes occurs, in the laser, so that the beat disappears, i.e. cannot be detected.

In using a ring laser as a precision angular displacement detector on a circular dividing and ruling machine, the angular displacement of the rotary table on which the disc to be ruled is mounted is measured by counting the number of beats of the ring laser output and the rotary table is stopped after predetermined angular displacements for ruling dividing lines on the disc. In this case, when the angular velocity of the rotary table is lower than the characteristic velocity of the ring laser, it is impossible to detect the beat due to mode coupling.

When a ring laser is installed on the ground, the frequency of the beat output from the rotation of the earth on its axis can indeed be theoretically found, but in practice cannot be measured because of the occurrence of oscillation mode coupling, for the rotating angular velocity of the earth is smaller than the characteristic velocity of the conventional ring lasers.

Further, a ring laser is also known in which a single ring laser system is oscillated at a certain period for a certain angle and the difference between the numbers of waves of beat during the clockwise and counterclockwise angular displacements is found for measuring the angular displacement, but accurate measurement is not possible because there is a time lag between the clockwise and counterclockwise angular displacements.

It is an object of the present invention to provide a differential ring laser capable of measuring very accurately in a determined time angular velocities and angular displacements not greater than the characteristic velocity of the ring laser.

With the above and other objects in view the invention will become apparent from the following detailed description, when taken in connection with the accompanying drawing, in which.

Figure 1:
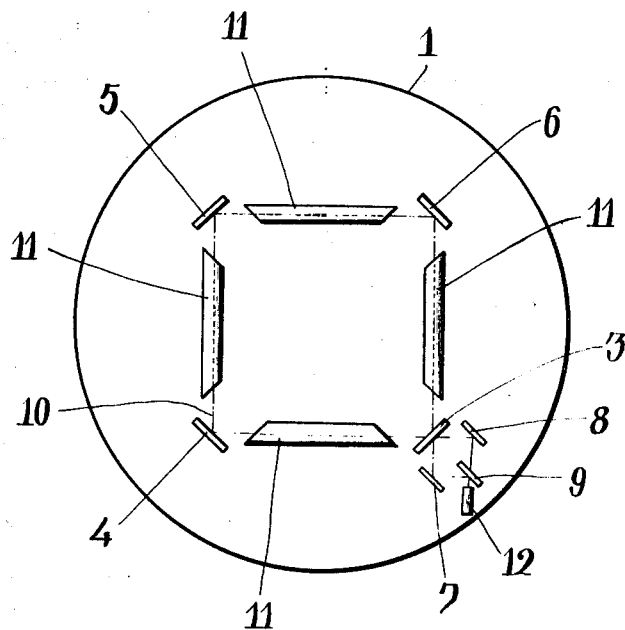
FIG. 1 is a plan view of a conventional square ring laser.

Referring to FIG. 1, a circular disc 1 rotates about the axis of a shaft 2. On said circular disc 1 are fixed a reflecting mirror 3 having 99 percent reflectivity and 1 percent transmittivity, reflecting mirrors 4, 5 and 6 having 100 percent reflectivity and four He-Ne laser tubes 11 arranged in the form of a square, these parts forming a ring laser with a square optical axis 10 (indicated by a broken line). Further, plain mirrors 7 and 8 having 100 percent reflectivity and a prism- or mirror-type beam splitter 9 having 50 percent reflectivity and 50 percent transmittivity are fixed on the same disc 1 to form an interferometer in which the optical waves travelling in opposite directions along the ring are, after having been transmitted through the reflecting mirror 3, are again overlapped at the beam splitter 9. A phototube 12 detects the interfered laser beam.

While the disc 1 is at rest, the phototube 12 generates a constant DC output.

When the disc 1 rotates at an angular velocity of $\omega_L$ per second, it has been proved by the theory of relativity that the following equations apply to the beat frequency $\Delta \nu_L$, the angular velocity of the disc $\omega$ and the surface area $S$ of the square defined by the optical axis 10: $\Delta \nu_L = \omega_L A/\lambda l$ (1)
and $$A = S \cos \alpha \quad (2)$$

wherein $\lambda$ = wavelength of laser beam, $l$ = length of a side of the square, and $\alpha$ = angle between the normal of $S$ surface and the axis of rotation.

Further, it has already been proved that the number $N$ of waves of beat generated during the angular displacement of the ring laser by an angle $\Phi$ is given by the following expression:

$$N = \frac{A}{\lambda l} \Phi \quad (3)$$

Figure 2:
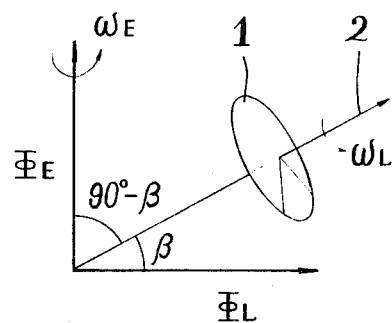
FIG. 2 is an illustrative diagram showing the relation of the rotation of a ring laser to the rotation of the earth on its axis.

It is now assumed that the ring laser of FIG. 1 is arranged at a latitude of $\beta$ and that the normal of surface $S$ is taken as the axis of rotation as shown in FIG. 2. When this axis of rotation is kept vertical and the disc 1 is rotated at an angular velocity $\omega_L$, the frequency of output beat $\Delta \nu$ of the ring laser is, due to the influence of the rotating velocity of the earth $\omega_E$, given by the following equation from physical analyses:

$$\Delta \nu = \frac{\omega_L}{\lambda l} S + \frac{\omega_E}{\lambda l} S \sin \beta \quad (4)$$

Assuming that the earth undergoes as angular displacement of $\Phi_E$ during the time of angular displacement of the ring laser by $\Phi_L$, the number of waves of beat $Ns$ generated during this period can be found by the following equation:

$$Ns = \frac{S}{\lambda l} \Phi_L + \frac{S}{\lambda l} \Phi_E \sin \beta \quad (5)$$

However, the equations (1), (2), (3), (4) and (5) are applicable only when the angular velocity of the ring laser $\omega_L$ is greater than its characteristic velocity, and not applicable if the former is equal to or smaller than the latter.

Figure 3:
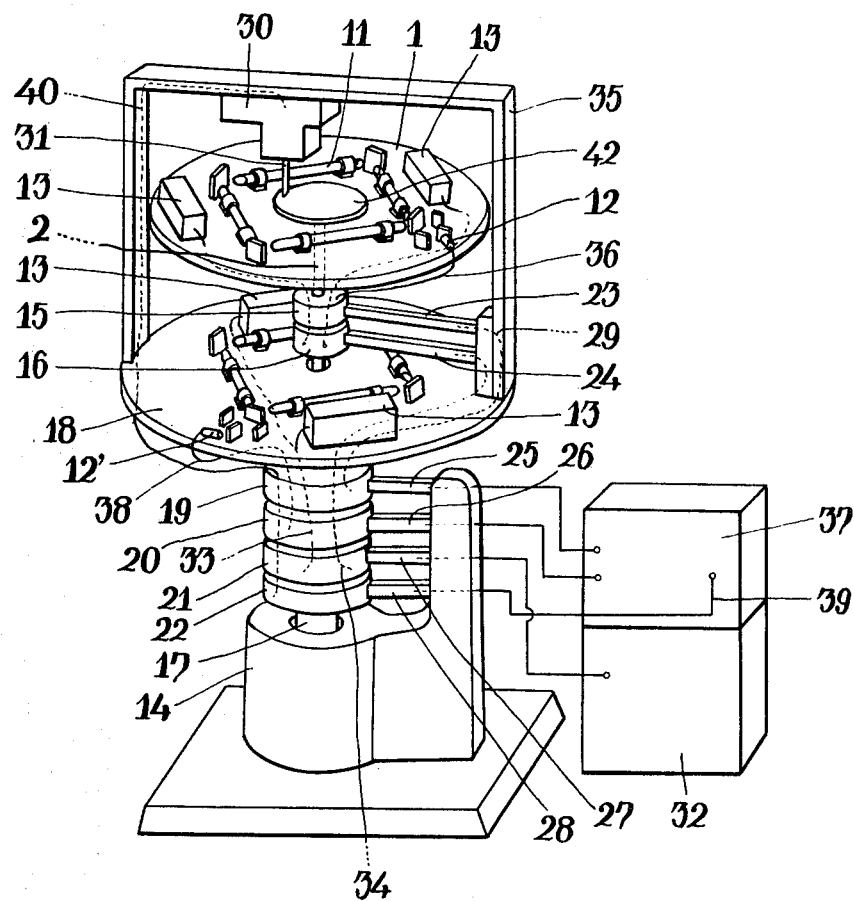
FIG. 3 is a perspective view of the differential ring laser according to the present invention, mounted on a precision circular dividing and ruling machine.

In FIG. 3, an angular displacement is accurately measured by the differential ring laser according to the present invention and dividing lines are ruled. On a circular disc 1 which rotates about the axis of a shaft 2 are fixed, in the same way as in FIG. 1, a ring laser comprising four laser tubes 11 and reflecting mirrors 3, 4, 5 and 6; an interferometer comprising reflecting mirrors 7 and 8 and a beam splitter 9; a phototube 12; and power supply 13 for laser tubes 11. Under the disc 1 are arranged cylindrical conductors 15 and 16 which rotate with said disc 1.

A circular disc 18 is supported by a center shaft 17 below and concentric to the first disc 1 and carries a ring laser system of the same size as does disc 1, an interferometer, a phototube and power supply. Cylindrical conductors 19, 20, 21 and 22 are fixed to the center shaft 17 and rotate with the disc 18.

The shaft 2 of the disc 1 extends through the shaft 17 and is supported together with the latter by a bearing block 14. The two shafts can be rotated in either direction and at any speed by motors and transmission mechanisms (not illustrated) built in the bearing block 14.

Secured to the disc 18 is a bow 35 the inner space of which is greater than the diameter of the disc 1. Said bow 35 is provided with contact brushes 23 and 24 associated with the cylindrical conductors 15 and 16. Secured to the top of the bow 35 is an automatic ruling machine 30, from which a cutter 31 extends downwardly in such a way that it faces a disc 42 arranged at the center of the disc 1 of which dividing lines are to be ruled.

Electric power to the power supplies 13 for lasers arranged on the discs 1 and 18 is supplied from a power source 32 through a contact brush 27 fixed to the bearing block 14, conductor lines 33 and 34, contact brush 24 and cylindrical conductor 16. And electric power to the ruling machine 30 is also supplied from the power source 32 through contact brush 27 and cylindrical conductor 21.

The laser tubes 11 on the discs 1 and 18 begin to discharge when energized by the power supplies 13 for lasers. The beat signal from the ring laser on the disc 1 is detected by the phototube 12 and the detected output signal is transmitted through conductor line 36, cylindrical conductor 15, contact brush 23, conductor line 29, cylindrical conductor 19 and contact brush 25 to a counter 37 having a built-in electronic control system. On the other hand, the beat signal from the ring laser on the disc 18 is also detected by the phototube 12' and transmitted through conductor line 38, cylindrical conductor 20 and contact brush 26 to the counter 37, where the number of beats difference between the two beat signals is counted. When the counted value reaches a predetermined value, the electronic control system in the counter emits a control signal for allowing the rotating speed of the disc 1 to coincide with that of the disc 18 and a command signal for releasing a ruling operation. The former is transmitted to a motor arranged in the bearing block 14 and driving the disc 1, and the latter is transmitted though conductor line 39, contact brush 28, cylindrical conductor 22 and conductor line 40 to the ruling machine 30. It receives the command and rules with a cutter 31 a dividing line on the disc 41 mounted at the center of the disc 1 when the relative angular velocity of the disc 1 to the disc 18 becomes zero.

After ruling, the disc 1 begins to rotate relatively to the disc 18, and, when the counted value of the difference between the two beat signals takes again the predetermined value, the rotating speeds of the discs 1 and 18 are equalized, to permit ruling of the next dividing line. These repeated operations take place through the program control of the electronic control system and the command signal of the counter 37.

In this case, the angular velocity of the disc 18 $\omega_{2L}$ should be greater than the characteristic velocity of the ring laser used. The angular velocity of the disc 1 $\omega_{1L}$ remains the same as that of the disc 18 during the ruling operation under the action of the command signal ($\omega_{1L} = \omega_{2L}$) but is greater than that in the section from one ruling operation to another ($\omega_{1L} < \omega_{2L}$).

Assuming that the angular displacements of the ring lasers on the discs 1 and 18 between two successive ruling operations are $\Phi_{1L}$ and $\Phi_{2L}$ respectively and that the angular displacement of the earth's rotation on its axis is $\Phi_E$, the following equations apply to the numbers of waves of output beat of both ring lasers $N_{1S}$ and $N_{2S}$ from the equation (5):

$$N_{1S} = \frac{S}{\lambda l}\Phi_{1L} + \frac{S}{\lambda l}\Phi_E \sin \beta \tag{6}$$

and $$N_{2S} = \frac{S}{\lambda l}\Phi_{2L} + \frac{S}{\lambda l}\Phi_E \sin \beta \tag{7}$$

Since the counter 37 emits a command for ruling based on the difference in beat between both ring lasers $N_D$, we obtain $$N_D = N_{1S} - N_{2S} = S/\lambda l \, (\Phi_{1L} - \Phi_{2L}) \tag{8}$$

Thus, with the differential ring laser according to the present invention, the relative angular displacement ($\Phi_{1L} - \Phi_{2L}$) between the discs 1 and 18 is determined by $N_D \times \lambda l/s$, so that the influence of the earth's rotation is eliminated, thus permitting accurate measurement of angular displacements.

A method of measuring the angular displacement of the earth's rotation on its axis using the differential ring laser according to the present invention will be now explained.

In FIG. 3, the disc 18 is rotated at a constant angular velocity $\omega_{2L}$ and the disc 1 is rotated in the opposite direction at the same angular velocity, i.e. $-\omega_{2L}$. Since the angular displacement of the latter $\Phi_{1L}$ is equal $-\Phi_{2L}$ when the former travels an angular displacement $\Phi_{2L}$, to the absolute value of the difference in the number of beats counted is given by the following equation from the equations (6), (7) and (8):

$$|N_D| = 2\frac{S}{\lambda l}\Phi_E \sin \beta \tag{9}$$

The resultant $$2\frac{S}{\lambda l}\Phi_E \sin \beta$$

is twice the number of beats generated by the conventional single ring laser for an angular displacement $\Phi_E$ of the rotating earth. The angular displacement of the rotating earth $\Phi_E$ during $t$ seconds can be easily found from $|N_D| \times \frac{\lambda l}{2S \sin \beta}$ by recording the number of beats $N_D$ for every $t$ seconds with the use of the ring laser according to the present invention.

Figure 4:
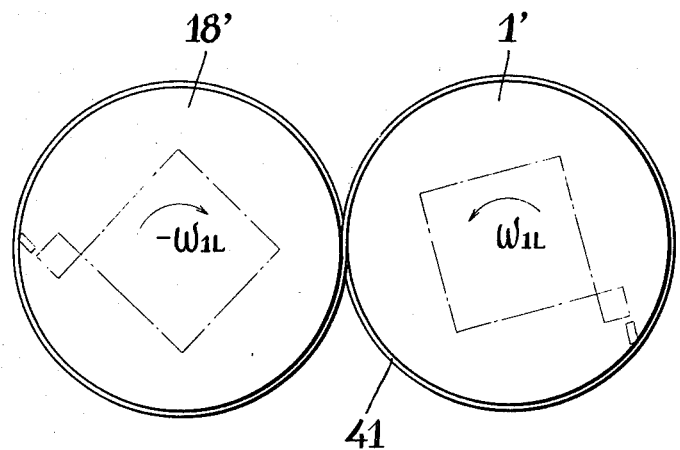
FIG. 4 is a plane view of an embodiment of the present invention for measuring the angular displacement of the earth.
Figure 5:
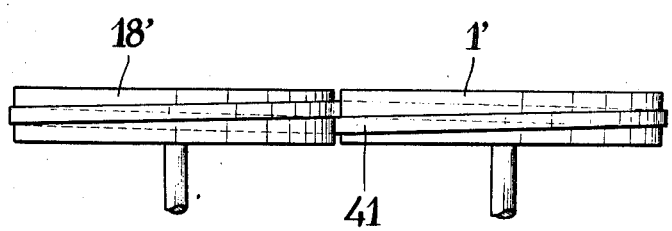
Fig. 5 is a front elevational view of the embodiment of FIG. 4.

While FIG. 3 shows an embodiment of the differential ring laser wherein two discs having a ring laser thereon are arranged in different horizontal planes and coaxially rotated, discs 1' and 18' are arranged adjacent to each other in the same horizontal plane and connected by an 8-shaped belt in FIGS. 4 and 5. When the disc 1' is rotated at a constant velocity, the disc 18' rotates in the opposite direction at the same velocity. Thus, the angular displacement of the earth can be easily measured in the same way as described before.

In place of the 8-shaped belt, the discs 1' and 18' may be provided on the circumference with a toothed rim having the same number of teeth for transmission between both discs.

As apparent from the above, the differential ring laser according to the present invention is capable of measuring highly accurately in a determined time not only the revolution of the earth, but also angular velocities or angular displacements at low velocities which are impossible to be measured by a single ring laser because coupling of oscillation modes occurs extinguishing the beat.

What I claim is:
1. A differential ring laser comprising in combination:
   a. first and second platforms rotatable about parallel axes of rotation and disposed in working relationship to each other;
   b. ring laser elements on each platform including four laser tubes (11) arranged in a square with three reflecting mirrors (4, 5, 6,) having 100 percent reflectivity and a fourth mirror (3) with an inner and outer side having about 99 percent reflectivity on the inner side, said four mirrors being at the corners of said square arranged to form a ring laser;
   c. fifth and sixth mirrors (7 and 8) disposed normal to the outer side of said fourth mirror, a beam splitter (9) disposed between said fifth and sixth mirrors (7 and 8) to form an interferometer;
   d. phototube means disposed to receive an output from said beam splitter; and,
   e. control means to rotate at controlled speeds said platforms in the one or the other direction and counter means coupled to the control means as well as the phototubes to determine the rotational direction and speed of said platforms.